April 18, 1961 B. N. TORELL 2,980,176
FAIL-SAFE AFTERBURNER FUEL CONTROL
Filed Jan. 15, 1957
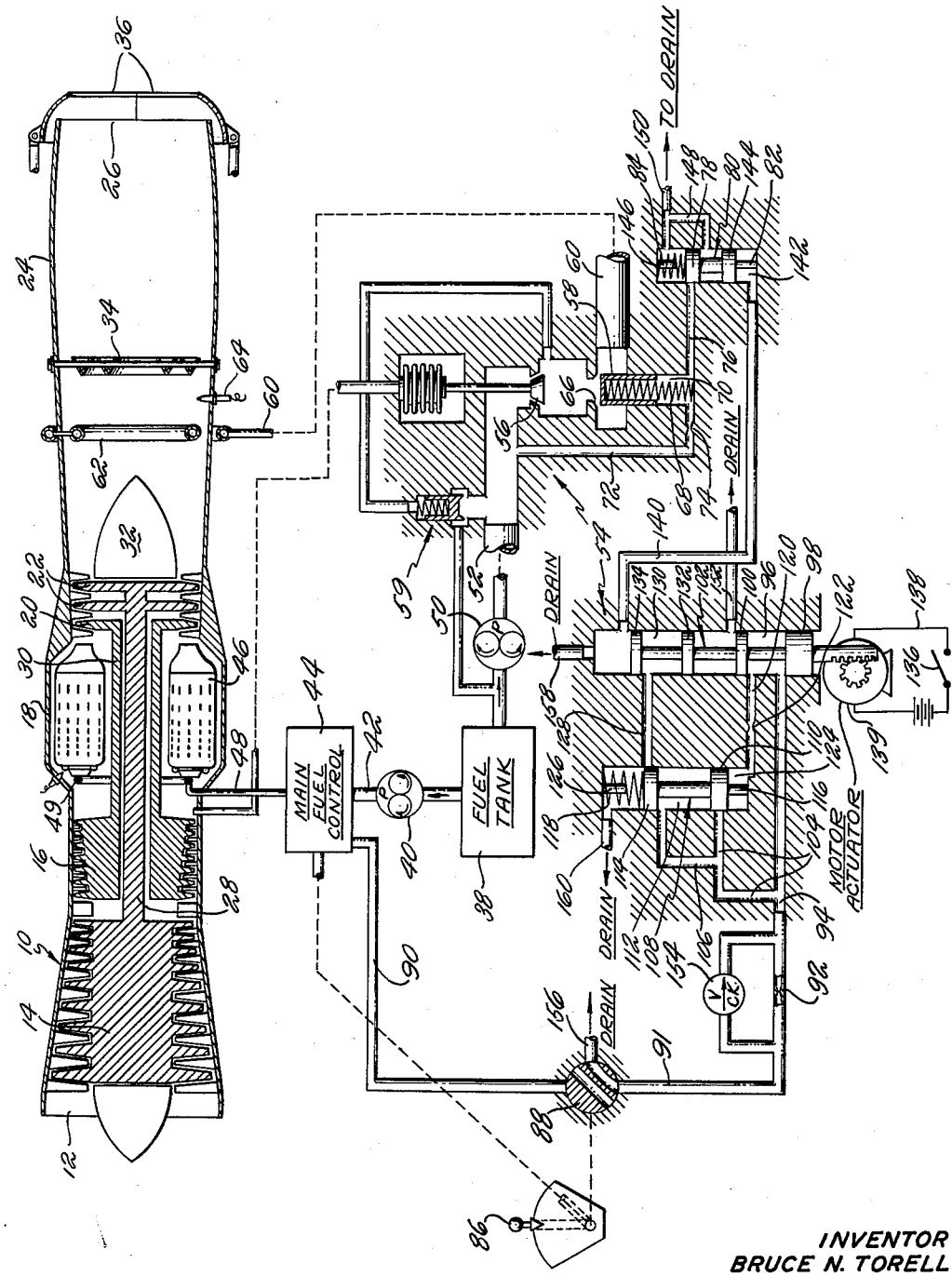
INVENTOR
BRUCE N. TORELL
BY
ATTORNEY

United States Patent Office 2,980,176
Patented Apr. 18, 1961

2,980,176

FAIL-SAFE AFTERBURNER FUEL CONTROL

Bruce N. Torell, Wethersfield, Conn., assignor to United Aircraft Corporation, East Hartford, Conn., a corporation of Delaware Filed Jan. 15, 1957, Ser. No. 634,255

8 Claims. (Cl. 158—36.4)

This invention relates to fuel control systems for aircraft power plants, more particularly to an afterburner fuel control for an afterburning gas turbine power plant.

The successful operation of aircraft power plants during flight is desired to protect human life as well as to save the aircraft from possible destruction. Certain aircraft use a gas turbine power plant having an afterburner and the afterburner is employed for take off purposes and in other situations where additional thrust is desired. The flow of fuel to the afterburner through the afterburner fuel system is generally controlled by a shut-off valve arrangement including a motor actuated valve. To protect against inoperativeness of the motor actuator, which could result from loss of electrical power or from the rupturing of a bellows or diaphragm, it has been found desirable to incorporate a fail-safe provision in the shut-off valve arrangement. This fail-safe provision permits termination of afterburner operation if the motor actuator becomes inoperative during afterburner operation and, further, it permits normal operation of the power plant throughout the non-afterburning range.

An object of this invention, therefore, is to provide an improved fuel control for the afterburner fuel system of an afterburning gas turbine power plant.

Another object of the invention is to provide a fail-safe device for an afterburner fuel system which permits the shutting off of the afterburner after a failure occurs.

Another object of the invention is to provide a fail-safe device for an afterburner fuel system which assures afterburning operation of a gas turbine power plant, and which permits complete operation of the power plant throughout the non-afterburning range.

Still another object of the invention is to provide a fail-safe device for an afterburner fuel system which prevents afterburner operation below a preselected power plant power output.

Other objects and advantages will be apparent from the following specification and claims, and from the accompanying drawing which illustrates an embodiment of the invention.

In the drawing:

The single figure shows an afterburner fuel system having a shut-off valve arrangement in accordance with this invention, in combination with an afterburning gas turbine power plant for aircraft.

Referring to the drawing in detail, the gas turbine power plant is indicated generally at 10, the power plant having inlet 12, low pressure compressor rotor 14, high pressure compressor rotor 16, combustion section 18, high pressure turbine rotor 20, low pressure turbine rotor 22, afterburner 24, and exhaust nozzle 26 in succession in the direction of gas flow through the power plant. Compressor rotor 14 is connected to turbine rotor 22 by means of shaft 28 to form a low pressure spool. Compressor rotor 16 is connected to turbine rotor 20 by means of sleeve 30 to form a high pressure spool, the spool surrounding shaft 28 and being coaxial therewith. Exhaust cone 32 is mounted downstream of the last stage of turbine rotor 22 at the inlet to afterburner 24. The afterburner includes flameholder 34 and eyelids 36 for varying the area of exhaust nozzle 26.

Fuel is supplied to the power plant from tank 38. Fuel for combustion section 18 is pumped by power plant driven pump 40 through conduit 42 to main fuel control 44. From here fuel is delivered to burner cans 46 in combustion section 18 through conduit 48 and annular manifold 49 connecting the burner cans.

Fuel for afterburner 24 is pumped by power plant driven pump 50 through conduit 52 to afterburner fuel control 54. In the control the fuel passes through compressor discharge responsive metering valve 56 and shut-off valve 58, the pressure drop across metering valve 56 being held constant by pressure drop regulating valve 59. Fuel then flows through delivery conduit 60 to annular manifold 62 mounted within afterburner 24 to be discharged into the afterburner. Spark plug 64 is provided for initiating combustion in the afterburner.

Shut-off valve 58 is urged toward a closed position with its seat 66 by spring 68 in chamber 70 on the back side of the valve. Fuel from a point in the afterburner fuel system between pump 50 and metering valve 56 is conducted to chamber 70 through passage 72 and restriction 74. Chamber 70 also is connected to passage 76, the passage having its downstream end blocked by land 78 on pilot valve 80. The pilot valve normally is maintained against stop 82 by spring 84, but the valve may be shifted upward to bleed fuel from chamber 70 and, thus, reduce the fuel pressure acting on the shut-off valve. It can be seen that shut-off valve 58 is urged closed by a fixed spring loading and by a variable fuel pressure loading, and as long as the combined loading exceeds metered fuel pressure the shut-off valve is held closed. Pilot valve 80 can be raised to reduce the pressure of the fuel in chamber 70 by a manually actuated and motor actuated fluid system to be described.

Operation of power plant 10 is controlled by movement of power lever 86 which is connected to main fuel control 44, as well as to two-way valve 88 joining conduits 90 and 91 extending between the main fuel control and afterburner fuel control 54. Rotation of the power lever schedules fuel flow through main fuel control 44 to combustion section 18 to give the desired performance of the power plant. The connection of the power lever with valve 88 is such that the valve connects conduit 91 with drain through a portion of the power lever travel and connects conduit 91 with conduit 90 and the main fuel control after the power lever has been advanced beyond a preselected minimum angle. When the power lever has been advanced beyond this angle, fluid pressure (fuel) is introduced from main fuel control 44 through valve 88 and conduit 91 to the shut-off valve controlling portion of afterburner fuel control 54.

Fluid admitted past valve 88 passes through orifice 92 and passage 94 to chamber 96 defined between lands 98 and 100 on motor actuated pilot valve 102. The pilot valve is a two-position valve and as shown the valve is in its first or "Off" position. Fluid also is admitted to passages 104 and 106 extending between passages 94 and pilot valve 108. The downstream end of passage 104 is blocked by land 110 on the pilot valve, while the fluid in passage 106 is admitted to chamber 112 defined between lands 110 and 114 on the pilot valve. Pilot valve 108 normally is maintained in the position shown against stop 116 by spring 118.

The fluid in chamber 96 of motor actuated pilot valve 102 passes through passage 120 and past restriction 122 to chamber 124 beneath land 110 on pilot valve 108. The pressure of the fluid will overcome the force of spring 118 and move the pilot valve upward against stop 126. In this position of the pilot valve fluid in passage 104 is admitted to chamber 124, thus short-circuiting chamber 96 of motor actuated pilot valve 102, passage 120 and restriction 122. Upward displacement of land 114 permits fluid to pass from chamber 112 through passage 128 to chamber 130 defined between lands 132 and 134 on motor actuated pilot valve 102. The described filling of the various passages and the displacement of pilot valve 108 occurs immediately after fluid is admitted past valve 88 by movement of power lever 86.

After power lever 86 has been advanced beyond the point opening valve 88, the power plant operator will close switch 136 in electrical circuit 138 controlling motor actuator 139 which drives pilot valve 102 between its two positions. Closing of the switch will move the pilot valve upward to a second "On" position. As pilot valve 102 moves upward, land 134 moves past the entrance to passage 140 and fluid from chamber 130 between lands 132 and 134 on the pilot valve is admitted through the passage to chamber 142 beneath land 144 on pilot valve 80. The pressure of the fluid will overcome the force of spring 84 and move the pilot valve upward against stop 146. In this position of the pilot valve afterburner fuel in chamber 70 behind shut-off valve 58 is bled through passages 76 and 148 to drain 150. The result is to reduce the forces tending to close shut-off valve 58 and permit the pressure of metered fuel to open the valve. Metered fuel will then flow to annular manifold 62 in afterburner 24.

Restriction 74 in passage 72 prevents excess flow of afterburner fuel through drain 150 when pilot valve 80 has been shifted upward. Similarly, restriction 122 in passage 120 prevents an excess of flow through drain 152 when motor actuated pilot valve 102 is in its "On" position.

Check valve 154, which is connected in parallel with orifice 92 in conduit 90, permits the rapid flow of fluid around orifice 92 to the shut-off valve controlling portion of afterburner fuel control 54 but it prevents reverse flow therethrough.

*Operation*

The power plant operator must fulfill two requirements to bring afterburner 24 into operation and these two requirements must be fulfilled in the proper sequence. The first requirement is movement of power lever 86 beyond a preselected minimum angle, below which afterburning is prohibited. This movement introduces pressurized fuel past valve 88 to the shut-off valve controlling portion of afterburner fuel control 54. The second requirement is the closing of switch 136 to complete an electrical circuit controlling the position of motor actuated pilot valve 102. Closing of this switch causes the pilot valve to be moved from its "Off" position as shown in the drawing to its "On" position. It is necessary if the afterburner is to be lit that both of these requirements be fulfilled and that they be fulfilled in the stated sequence.

By reference to the drawing it will now be described why the afterburner cannot be lit if the power plant operator omits fulfilling either requirement or follows the wrong sequence, and it will then be demonstrated how the afterburner is lit when the proper sequence is followed.

*First requirement omitted.*—If the power plant operator closes switch 136 to move motor actuated pilot valve 102 to its "On" position but does not advance power lever 86 beyond the required minimum angle, land 98 blocks the downstream end of passage 94 and no pressure fluid will flow into passage 120 and chamber 124 to lift pilot valve 108. Therefore, there can be no fluid flowing to chamber 142 to raise pilot valve 80 and reduce the fuel pressure in chamber 70 behind shut-off valve 58.

*Second requirement omitted.*—If the power plant operator has moved power lever 86 beyond the minimum required position for opening valve 88, but has failed to close switch 136 to shift the position of motor actuated valve 102, pressure fluid will raise pilot valve 108 but the fluid cannot advance beyond chamber 130.

*Improper sequence of fulfilling requirements.*—If the power plant operator closes switch 136 to move motor actuated pilot valve 102 to its "On" position and then, subsequently, moves power lever 86 above the minimum required angle, the flow of pressure fluid to chamber 124 below pilot valve 108 is blocked by land 98 on motor actuated pilot valve 102.

*Requirements fulfilled in proper sequence.*—When the power plant operator advances power lever 86 sufficiently far to open valve 88 pressure fluid flows through passage 94 and chamber 96 into chamber 124 to raise pilot valve 108. This permits the admission of fluid to chamber 130. When the power plant operator closes switch 136 motor actuated pilot valve 102 is raised to provide communication between passages 128 and 140. Fluid then flows to the chamber beneath pilot valve 80 to raise the pilot valve. Raising of this pilot valve provides communication between passages 76 and 148 to reduce fuel pressure in chamber 70 behind shut-off valve 58. As soon as metered fuel pressure exceeds the loading on shut-off valve 58 the valve is opened and metered fuel flows to the afterburner where it may be ignited to set the afterburner in operation.

Pilot valve 108 will remain in its raised position since restriction 122 in passage 120 assures sufficient fluid pressure in chamber 124 below the pilot valve to hold the pilot valve against stop 126. Should a failure in electrical circuit 138 occur or should motor actuator 139 become inoperative, motor actuated valve 102 would remain in its "On" position permitting fluid to reach chamber 142 below pilot valve 80. The pressure of the fluid raises the pilot valve to reduce the closing pressure in chamber 70 and assures the flow of metered fuel to the afterburner for continued operation thereof. With motor actuated pilot valve 102 in its "On" position and with its actuator unable to shift the valve to its "Off" position due to failure of the motor actuator or loss of elecrical power, afterburner operation may be terminated by retarding power lever 86 beyond the point which closes valve 88 and cuts off fluid from the shut-off valve controlling portion of the afterburner fuel control. Further initiation of afterburner operation after the motor actuator has become inoperative and after the afterburner has been turned off is prevented since land 98 on motor actuated pilot valve 102 blocks the flow of fluid into chamber 124 below pilot valve 108.

*Normal termination of afterburner operation.*—During normal trouble-free operation of the afterburner the pilot may turn off the afterburner by energizing the motor actuator to move motor actuated pilot valve 102 to its "Off" position or by retarding power lever 86 to cut off pressure fluid from chambers 124 and 142. Pilot valves 108 and 80 then will be lowered since chamber 124 below pilot valve 108 will be connected to drain 152 or drain 156 and chamber 142 below pilot valve 80 will be connected to drain 156 or drain 160. With pilot valve 80 in its lower position, pressure in chamber 70 will increase to close shut-off valve 58 and cut off the flow of fuel to the afterburner.

Some aircraft use a single gas turbine power plant and to protect against fuel pump failure these aircraft are provided with a plurality of fuel pumps including a main pump and an emergency pump. During take off operation the main pump could fail which would cause a temporary decrease in the fluid pressure in the shut-off valve controlling portion of the afterburner fuel control. However, since the emergency pump would take over upon failure of the main pump, the diminished fluid pressure is a temporary condition. To prevent the afterburner from going off due to the temporary decrease in fluid pressure, check valve 154 is provided in connection with conduit 91. The check valve permits a rapid build up of pressure in the shut-off valve controlling portion of the control since fluid can flow thereto through orifice 92 and through the check valve. Reverse flow through the check valve is not possible, reverse flow being limited through orifice 92. Thus, any temporary loss of fluid presesure due to fuel pump failure would not cause the afterburner to stop operating.

It is to be understood that the invention is not limited to the specific embodiment herein illustrated and described, but may be used in other ways without departure from its spirit as defined by the following claims.

I claim:

1. In a fuel system for a gas turbine power plant, a conduit through which fuel under pressure is delivered to said power plant, a shut-off valve in said conduit, fuel pressure means for closing said shut-off valve in response to an increase in pressure, control means for controlling the pressure of said fuel pressure means, means for introducing a fluid pressure to said control means when required power plane operation exceeds a predetermined level, said control means including a first pilot valve controlling the effect of said fuel pressure upon said shut-off valve, and at least one pilot valve controlling the admission of said fluid pressure to said first pilot valve, at least one of said pilot valves being motor actuated.

2. In a fuel system for a gas turbine power plant, a conduit through which fuel is delivered to said power plant, a shut-off valve in said conduit, pressure means for closing said shut-off valve in response to an increase in pressure, a power lever for controlling said power plant, control means for controlling the pressure of said pressure means and means operatively connected with said power lever for introducing a fluid pressure to said control means when said power lever is advanced beyond a predetermined position, said control means including a first pilot valve controlling the effect of said pressure means upon said shut-off valve, and at least one pilot valve controlling the admission of said fluid pressure to said first pilot valve, at least one of said pilot valves being motor actuated.

3. In a fuel system for a gas turbine power plant, a conduit through which fuel is delivered to said power plant, a shut-off valve in said conduit, pressure means for closing said shut-off valve in response to an increase in pressure, a power lever for controlling said power plant, control means for controlling the pressure of said pressure means and means operatively connected with said power lever for introducing a fluid pressure to said control means when said power lever is advanced beyond a predetermined position, said control means including a first pilot valve controlling the effect of said pressure means upon said shut-off valve, and at least one pilot valve controlling the admission of said fluid pressure to said first pilot valve, at least one of said pilot valves being motor actuated and at least one of said pilot valves being actuated by said fluid pressure.

4. In a fuel system for a gas turbine power plant, a conduit through which fuel is delivered to said power plant, a shut-off valve in said conduit, means for closing said shut-off valve, fluid means for controlling the pressure of said closing means, means for introducing a fluid pressure to said fluid means when required power plant operation exceeds a predetermined level, said fluid means including first pilot valve means, second pilot valve means, third pilot valve means, means including a first position of said second pilot valve means for admitting fluid pressure to one end of said pilot valve means to shift said first pilot valve means and admit said fluid pressure beyond said first pilot valve means, means including a second position of said second pilot valve means for admitting said fluid pressure beyond said second pilot valve means to said third pilot valve means, and means controlled by the position of said third pilot valve means for modifying the effect of said closing means upon said shut-off valve to permit the opening of said shut-off valve.

5. In a fuel system for a gas turbine power plant, a conduit through which fuel is delivered to said power plant, metering means in said conduit for regulating fuel flow therethrough, a shut-off valve in said conduit downstream of said metering means, hydraulic pressure means for closing said shut-off valve, a power lever for controlling said power plant, fluid means for controlling the pressure of said hydraulic pressure means and means operatively connected with said power lever for introducing a fluid pressure to said fluid means when said power lever is advanced beyond a predetermined position, said fluid means including first pilot valve means, second pilot valve means, third pilot valve means, means including a first position of said second pilot valve means for admitting fluid pressure to one end of said first pilot valve means to shift said first pilot valve means and admit said fluid pressure beyond said first pilt valve means, means including a second position of said second pilot valve means for admitting said fluid pressure beyond said second pilot valve means to said third pilot valve means, and means controlled by the position of said third pilot valve means for modifying the effect of said hydraulic pressure upon said shut-off valve to permit the opening of said shut-off valve.

6. In a fuel system for a gas turbine power plant, a conduit through which fuel is delivered to said power plant, metering means in said conduit for regulating fuel flow therethrough, a shute-off valve in said conduit downstream of said metering means, hydraulic pressure means for closing said shut-off valve, a power lever for controlling said power plant, fluid means for controlling the pressure of said hydraulic pressure means and means operatively connected with said power lever for introducing a fluid pressure to said fluid means when said power lever is advanced beyond a predetermined position, said fluid means including first pilot valve means, a two-position motor actuated pilot valve means, third pilot valve means, means including a first position of said motor actuated pilot valve means for admitting fluid pressure to one end of said first pilot valve means to shift said first pilot valve means and admit said fluid pressure beyond said first pilot valve means, means including a second position of said motor actuated pilot valve means for admitting said fluid pressure beyond said motor actuated pilot valve means to said third pilot valve means, and means controlled by the position of said third pilot valve means for modifying the effect of said hydraulic pressure upon said shut-off valve to permit the opening of said shut-off valve.

7. In a fuel system for a gas turbine power plant, a conduit through which fuel is delivered to said power plant, metering means in said conduit for regulating fuel flow therethrough, a shut-off valve in said conduit downstream of said metering means, means for closing said shut-off valve, a power lever for controlling said power plant, fluid means for controlling said closing means and means operatively connected with said power lever for introducing a fluid pressure to said fluid means when said power lever is advanced beyond a predetermined position, said fluid means including first pilot valve means, an orifice and a check valve in parallel relationship interposed between said operatively connected means and said first pilot valve means, two-position motor actuated pilot valve means, means including a first position of said motor actuated pilot valve means for admitting fluid pressure to one end of said first pilot valve means to shift said first pilot valve means and admit said fluid pressure beyond said first pilot valve means, third pilot valve means, means including a second position of said motor actuated pilot valve means for admitting said fluid pressure beyond said motor actuated pilot valve means to said third pilot valve means, and means controlled by the position of said third pilot valve means for modifying the effect of said closing means upon said shut-off valve to permit the opening of said shut-off valve.

8. In a fuel system for a gas turbine power plant, a conduit through which fuel is delivered to said power plant, metering means in said conduit for regulating fuel flow therethrough, a shut-off valve in said conduit downstream of said metering means, hydraulic pressure means for closing said shut-off valve, a power lever for controlling said power plant, fluid means for controlling the pressure of said hydraulic pressure means and means operatively connected with said power lever for introducing a fluid pressure to said fluid means when said power lever is advanced beyond a predetermined position, said fluid means including first pilot wave means, an orifice and a check valve in parallel relationship interposed between said operatively connected means and said first pilot valve means, two-position motor actuated pilot valve means, means including a first position of said motor actuated pilot valve means for admitting fluid pressure to one end of said first pilot valve means to shift said first pilot valve means and admit said fluid pressure beyond said first pilot valve means, third pilot valve means, means including a second position of said motor actuated pilot valve means for admitting said fluid pressure beyond said motor actuated pilot valve means to said third pilot valve means, and means controlled by the position of said third pilot valve means for modifying the effect of said hydraulic pressure on said shut-off valve to permit the opening of said shut-off valve.

References Cited in the file of this patent

UNITED STATES PATENTS

| | | |
|---|---|---|
| 2,667,743 | Lee | Feb. 2, 1954 |
| 2,845,079 | Hutton | July 29, 1958 |

FOREIGN PATENTS

| | | |
|---|---|---|
| 918,159 | France | Oct. 7, 1946 |

UNITED STATES PATENT OFFICE
CERTIFICATE OF CORRECTION

Patent No. 2,980,176                              April 18, 1961

Bruce N. Torell

It is hereby certified that error appears in the above numbered patent requiring correction and that the said Letters Patent should read as corrected below.

Column 5, line 69, before "pilot" insert -- first --; column 6, line 19, for "pilt" read -- pilot --; line 30, for "shute-off" read -- shut-off --.

Signed and sealed this 12th day of September 1961.

(SEAL)
Attest:

ERNEST W. SWIDER
Attesting Officer

DAVID L. LADD
Commissioner of Patents

USCOMM-DC